UNITED STATES PATENT OFFICE.

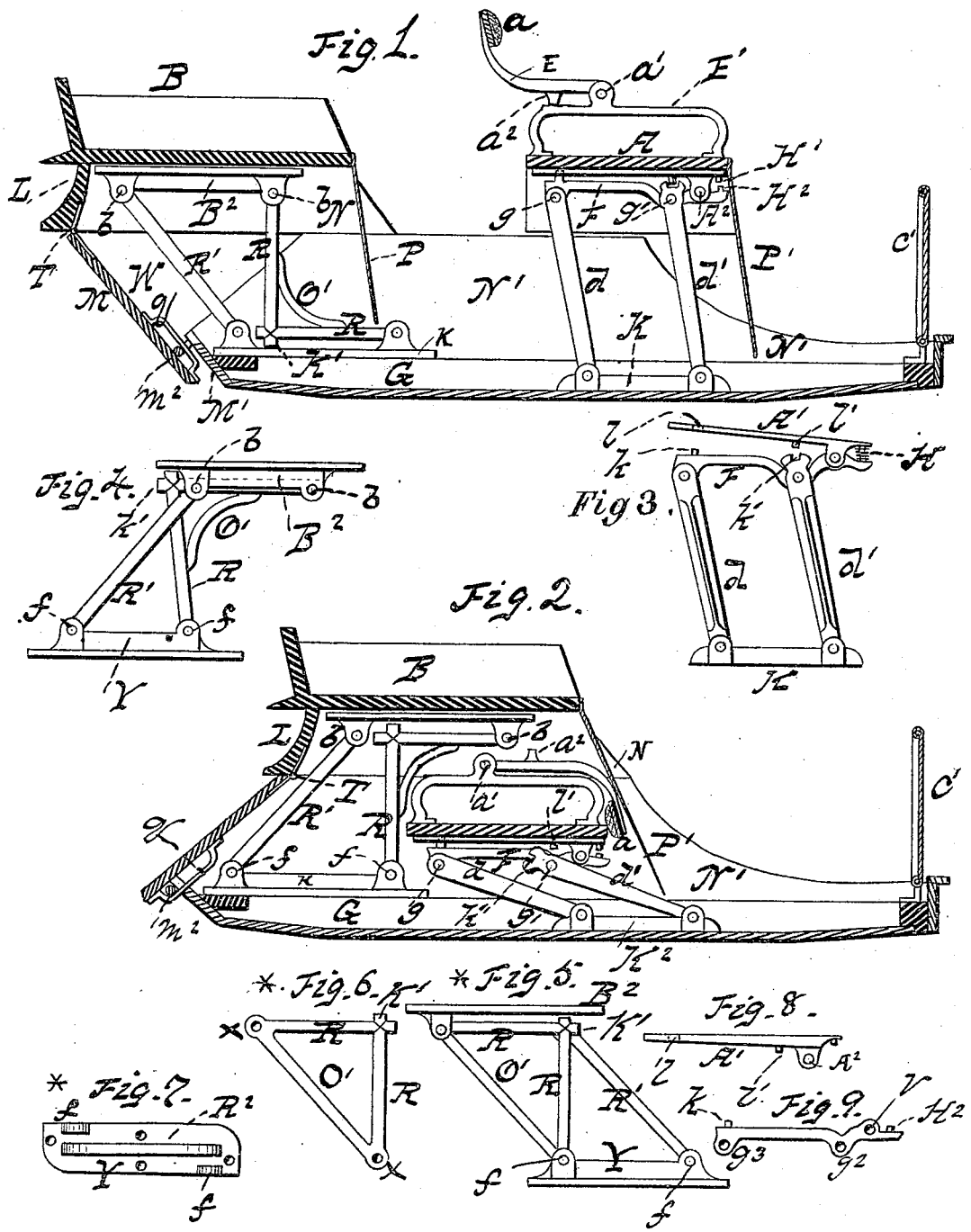

THEOPHILUS WEAVER, OF HARRISBURG, PENNSYLVANIA.

CARRIAGE-SEAT.

SPECIFICATION forming part of Letters Patent No. 248,818, dated October 25, 1881.

Application filed April 21, 1881. (No model.)

*To all whom it may concern:*

Be it known that I, THEOPHILUS WEAVER, of Harrisburg, county of Dauphin, and State of Pennsylvania, have invented new and useful Carriage Jump-Seats and Attachments, of which the following is a specification.

My invention relates to vehicles which may be adjusted from a single to a two seated conveyance, and its main, novel, and useful features are, first, peculiarly-pivoted lay-down front-seat frames, each composed of two uprights and three transverse bars, of which latter the top or seat-attaching bar is hinged to the middle bar, and regulates the set and releasement of the uprights simply by lifting and lowering the front part thereof; second, certain extensions and projections on said upper transverse bars, to better regulate the set and the releasement of said uprights; third, a jump-seat frame of four parts pivoted together without stops about their pivotal points, its movements being limited solely by the tread of the riser-form front brace at relievable studs thereon; fourth, certain horizontal side sections of a close-carriage body, supplemental to the stationary low sides thereof, and a certain shifting rear panel with special hinge-connections, all supported as adjuncts of the rear jump-seat, and operated by it; fifth, certain stops for the lazy-back arms, arranged distinct from the hinges of the arms. I attain these objects by mechanism illustrated in the accompanying drawings, in which—

Figure 1 is a longitudinal section of my improved carriage adjusted as a two-seated vehicle with my improved jump-seats and lazy-back in position for occupancy. Fig. 2 is a like view of the same, adjusted as a single-seated conveyance. Fig. 3 represents a view of my front-seat-supporting frame, unlatched for laying down. Figs. 8 and 9 are details of the same. Fig. 4 represents my rear-seat-supporting frame with front leg retreated and off-set. Fig. 5 represents my rear-seat-supporting frame modified, with a two-way diagonal erect brace offsetted relative to the other upright. Figs. 6 and 7 are details of the same.

Similar letters refer to similar parts in the several views.

A represents the front seat; B, the rear seat.

A' represents the hinged top bar of the front-seat-supporting frame, to which the seat-board is attached.

$A^2$ represents the hinge-joint, at which bar A' is jointed to bar F, which is fulcrumed at $g\ g'$ to the uprights $d\ d'$, as shown. Said uprights are pivoted to foot-bar $K^2$. The upright $d'$ extends beyond the transverse bar F, and has on its upper end a double strike and jaw, $k'$, and bar A' has a tenon or bit, $l'$, to engage said jaw squarely when the seat is set. It holds the seat, set both ways, until it is released, as shown in Fig. 3, by raising the rear edge of seat or bar A'. The upper end of upright $d'$ may be made the tenon, and the bar A' may have a corresponding jaw or mortise in or on it for its reception. The upright $d$ ends at bar F, but it may also be extended and entered like upright $d'$. The bar F has formed on it a stud, $k$, to enter a mortise, $l$, in bar A' when it is down, to keep the parts superimposed, and to resist lateral strain. The lift of bar A' is limited by two studs, $H^2$, coming in contact, and a spiral spring inserted between the ends of bars A' and F and around said studs acts to keep the parts hitched when the seat is set. This seat-supporting frame may be laid down both ways. Said bars A' and F are made in form substantially as shown in Figs. 8 and 9, respectively.

In Figs. 1 and 2 are shown rear-seat-supporting frames, with novel form of front leg, O' R, it presenting a horizontal part, R, and tread or heel K', which supports the seat on it both ways, the other part, R, being similar and arranged to be erect in both positions of the seat, as a vertical brace thereunder. The other parts—the attaching-bars $B^2$ and K and the upright R'—are made in the usual form. The object of this form of said front leg is not only to afford stiff bracing with little weight of metal, but also to stand out of the way under the seat when it is jumped forward and the front seat is folded thereunder, as shown in Fig. 2. When it is desired to have said leg stand still more retreated it may be modified as shown in Fig. 4, having its pivots at band $f$ and its tread K' to the rear of the other upright, R'. The uprights are in such case off-setted from each other, the standards on the attaching bar or plate being arranged as shown in Fig. 7. Sometimes, when symmetry is made an item of value, the regular and more elegant form of two-way erect brace or leg shown in Fig. 5 is preferred. It is the same in principle as that shown in Figs. 1 and 2. The erect parts R are similar parts of a right-angled triangle a little extended beyond their point of intersection at K', as before set forth, and having their other ends massed in the long side of the triangle, as shown in detail, Fig. 6. The extremities at K' are so made that the throw of the seat may be varied or lengthened by filing a part off the same, thus readily truing up the work of setting the irons in carriages, where inequalities in the sills must sometimes be compensated for by a corresponding depression of the seat-supports. The last-named modification is also offsetted from the oblique brace R', and is shown at the rear end of the rear-seat-supporting frame. Said triangular leg may be built of pieces of round merchant-iron, united at the pivotal points and at the point of intersection of the short sides; but it is preferable to make it a casting.

The side of the carriage-body shown in Figs. 1 and 2 is longitudinally divided into the stationary part N' and the extensible part N, the latter being combined with the rear seat, as a skirting thereof. The back of said body is also divided on the same horizontal plane, having the part L combined as an attachment to said seat, as shown, and having the panel M hinged to part L and connected by sliding hinges $q\,m$ to the fixed base M', as shown. The adjustment of the said attached parts and panel is automatic and wholly dependent on the movement of the rear seat. The hinge $q\,m$ is simply a set of guides or clips, $q$, in which fixed studs $m$ traverse back and forth as the panel is moved by the jump-seat B. The connected parts M and M' are made rattle-proof by rubber facings applied between them.

The lazy-back on my front seat, A, is composed of the folding arms E, having back $a$ thereon, and of the handles E'. Said arms are provided with the rests $a^2$, distinct from the hinge at $a'$. The object of this improvement is to avoid the more expensive and less acceptable stop-hinge joint usually on lazy-backs, which is liable to catch clothing and hands in handling it.

The projections or studs on the brace R are so made, as shown, that they may be readily dressed down to vary the set of the seat-frame. Springs may also be arranged between the upper one and the attaching-bar $B^2$, to relieve the set of the parts on each other.

Having described my invention, I add claims embracing what I regard as new and useful and desired to be secured by the Letters Patent asked.

I claim—

1. Carriage-seat-supporting frames, each composed of two upright braces or legs, $d\,d'$, and two transverse bars, F K, pivoted and fulcrumed together to form a freely-shifting lay-down parallelogram, with an added transverse bar or seat-attaching plate, A', hinged to bar F and applied to limit the movement of said legs and release the same, substantially as set forth.

2. In the seat-supporting frames $d\,d'$ A' F K, with parts constructed and combined as set forth, the extensions H' H$^2$, or their equivalents, on the hinged parts A' and F, for limiting the lift of the seat in adjusting it, as set forth.

3. A self-stayed jump-seat frame consisting of two attaching-plates, B$^2$ K, and two braces, R R', pivoted together and having their movements limited solely by the front brace, R, made riser form and provided exterior to its angle with short studs, which have the main stress on them, and may be readily altered by dressing down to vary height of seats, or by inserting springs thereat to relieve the set on said plates, substantially as and for the purposes set forth.

4. The attachments N, firmly affixed to the ends of the jump-seat B, made with horizontal lower margins, supplemental to the non-adjustable sections N' of the carriage-body, and operating in conjunction with the said seat B to close the sides of the body when the carriage is adjusted to be single-seated, and to form, with seats A and B both extended, a convenient low-sided open carriage, substantially as and for the purpose set forth.

5. The panel attachment M, hinged to the back of jump-seat B, and connected extensibly by clips $q$ thereon to the fixed part M' by studs or eyes $m$ thereon, to compensate for the eccentric movement of said jump-seat in relation to the lower edge of said panel, substantially as and for the purposes set forth.

6. In combination with the lazy-back handles E', the stops $a^2$, arranged distinct from the knuckles $a'$, by which the folding arms E are hinged to said handles, for the purpose set forth.

In testimony that I claim the foregoing as my invention I have hereunto set my hand and seal, this 19th day of April, 1881, in presence of two witnesses.

THEOPHILUS WEAVER. [L. S.]

Attest:
JNO. D. KINNEARD,
M. G. REIBER.